US009380050B2

(12) United States Patent
Tredoux et al.

(10) Patent No.: US 9,380,050 B2
(45) Date of Patent: Jun. 28, 2016

(54) SCAN IMAGE AUTHENTICATION

(71) Applicant: Xerox Corporation, Norwalk, CT (US)

(72) Inventors: Gavan L. Tredoux, Penfield, NY (US); Premkumar Rajendran, Webster, NY (US); Roger T. Kramer, Rochester, NY (US); Peter J. Zehler, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 49 days.

(21) Appl. No.: 14/310,074

(22) Filed: Jun. 20, 2014

(65) Prior Publication Data

US 2015/0372988 A1   Dec. 24, 2015

(51) Int. Cl.
| H04L 9/00 | (2006.01) |
| H04L 29/06 | (2006.01) |
| H04L 9/32 | (2006.01) |
| H04W 12/06 | (2009.01) |

(52) U.S. Cl.
CPC .......... *H04L 63/0823* (2013.01); *H04L 9/3247* (2013.01); *H04L 63/123* (2013.01); *H04W 12/06* (2013.01)

(58) Field of Classification Search
CPC .............................. G06F 17/2205; G06F 21/00
See application file for complete search history.

(56) References Cited

U.S. PATENT DOCUMENTS

| 5,898,779 | A | 4/1999 | Squilla et al. |
| 6,269,446 | B1 * | 7/2001 | Schumacher ...... H04N 1/32128 380/30 |
| 7,454,797 | B2 | 11/2008 | Zhu et al. |
| 7,694,137 | B2 | 4/2010 | Matsuya |
| 7,791,768 | B2 | 9/2010 | Yoshikawa |
| 8,229,458 | B2 | 7/2012 | Busch |
| 8,321,922 | B1 | 11/2012 | Lo et al. |
| 8,325,044 | B2 | 12/2012 | Martinez de Velasco Cortina et al. |
| 8,400,648 | B2 | 3/2013 | Eun et al. |
| 8,442,221 | B2 | 5/2013 | Ming |
| 2002/0026583 | A1 * | 2/2002 | Harrison ............... H04L 9/3236 713/172 |
| 2007/0150739 | A1 * | 6/2007 | Masui ................. G06F 17/2205 713/178 |
| 2008/0301815 | A1 * | 12/2008 | Lauter .................... G03G 21/04 726/26 |
| 2010/0188713 | A1 | 7/2010 | Ogura et al. |
| 2010/0299527 | A1 | 11/2010 | Arunan et al. |
| 2011/0313922 | A1 | 12/2011 | Ben Ayed |
| 2012/0052872 | A1 | 3/2012 | Do |
| 2012/0140267 | A1 | 6/2012 | Lee et al. |
| 2012/0202423 | A1 | 8/2012 | Tiedemann et al. |
| 2012/0226600 | A1 | 9/2012 | Dolev |
| 2013/0132282 | A1 | 5/2013 | Shakkarwar |
| 2013/0159718 | A1 | 6/2013 | Farkas et al. |
| 2013/0185213 | A1 | 7/2013 | Insanic |

FOREIGN PATENT DOCUMENTS

| WO | 2013/072437 | 5/2013 |
| WO | 2013/121356 | 8/2013 |

* cited by examiner

*Primary Examiner* — Brandon Hoffman
*Assistant Examiner* — Helai Salehi
(74) *Attorney, Agent, or Firm* — Gibb & Riley, LLC

(57) ABSTRACT

Methods and systems receive an electronic scanned image generated by activity of an application running on a portable computerized device, and calculate a cryptographic digest from data of the electronic scanned image using a second computerized device. Also, such methods and systems encrypt the cryptographic digest using an encryption key stored on the portable computerized device to create a content signature of the cryptographic digest, and send the content signature to the second computerized device. The authenticity of a copy of the electronic scanned image provided by the second computerized device is verified by recalculating the content signature (based on the copy of the electronic scanned image) using the encryption key from the portable device.

17 Claims, 5 Drawing Sheets

SCAN IMAGE AUTHENTICATION

BACKGROUND

Systems and methods herein generally relate to methods and systems that create and provide scanned images, and more particularly to methods and systems that verify the authenticity of scanned images.

Scanning of documents is widely practiced, but suffers from some drawbacks. When a multi-function device (MFD) is used to scan the documents, the device may inform the user that the scan has been delivered, but the user has no easy-to-use way of knowing exactly what the device delivered, and may resort to later visual inspection of the files in the location to which they have been delivered, if that is possible (often it is not). Many things could go wrong with delivery and storage of the scans: bytes may be dropped en-route due to bugs in various systems, despite the best intentions, or due to malicious activity; data may also be substituted deliberately at a later date; etc.

There are many use cases where it is worthwhile to be able to verify that the scan data was delivered correctly, that the scan originated in a known and verifiable location, by a known and verifiable person, and that it has not been tampered with or compromised since it was scanned and deposited. These are "chain-of-custody" and safe delivery guarantees from inception onward.

SUMMARY

Some methods herein verify the authenticity of a scan using a system that can include for example, among other components, an application running on a portable computerized device and one or more second computerized device (which can include multiple devices, such as a location service computerized device, a delivery service computerized device, etc.) that are separate from the portable computerized device.

These methods receive an electronic scanned image generated by activity of the application, calculate a cryptographic digest from data of the electronic scanned image (using the second computerized device), and receive back to the application from the second computerized device, the cryptographic digest. Also, such methods encrypt the cryptographic digest (using the application) using an encryption key stored on the portable computerized device to create a content signature of the cryptographic digest, and send the content signature from the application to the second computerized device. The authenticity of a copy of the electronic scanned image provided by the second computerized device is verified by recalculating the content signature based on the copy of the electronic scanned image using the encryption key from the portable computerized device.

Other methods herein verify the authenticity of a scan using a similar system comprising an application running on a portable computerized device and second computerized device(s) separate from the portable computerized device. Such methods cause a scanning machine to scan a physical item to generate an electronic scanned image, and cause the scanning machine to transmit the electronic scanned image to the second computerized device. With such methods, a cryptographic digest is calculated using the second computerized device by applying a cryptographic hash function to data of the electronic scanned image.

These methods also use the application to encrypt the cryptographic digest using an encryption key stored on the portable computerized device, and this creates a content signature of the cryptographic digest. Then, the content signature is sent to the second computerized device and, after the application sends the content signature to the second computerized device, these methods can receive a request to a download a copy of the electronic scanned image from a requestor.

In response to the request to download the copy of the electronic scanned image, these methods recalculate a "current" cryptographic digest (locally or using the second computerized device) by applying the cryptographic hash function to data of the copy of the electronic scanned image. Then, the requester can encrypt such a current cryptographic digest using the encryption key stored on the portable computerized device to create a "current" content signature of the current cryptographic digest. By comparing the current content signature with the content signature to see if the signatures match, this verifies whether the copy of the electronic scanned image is identical to the electronic scanned image.

Additional methods herein verify the authenticity of a scan using a system, such as those discussed above. Such methods send a token (such as a time stamped location token) to a wireless scanning machine identification code device (such as a near field communications tag) of a scanning machine while the portable computerized device is positioned within communicating distance of the near field communications tag (e.g., at a first location that is within a first distance from the scanning machine) to cause the scanning machine identification code device to create a counter-signed token. The counter-signed token is received back from the wireless machine identification code device by the portable computerized device while positioned at the first location. Having received the counter-signed token from the scanning machine, the application then signs the counter-signed token using a certificate of the portable computerized device to create a double counter-signed token (or what is sometimes referred to as a "counter-counter-signed token").

Then, the application (or the user) causes the scanning machine to scan a physical item to generate an electronic scanned image. The application then sends the counter-counter-signed token to the scanning machine to cause the scanning machine to include the counter-counter-signed token in metadata of the electronic scanned image. The scanning machine then sends the electronic scanned image (including the metadata that contains the counter-counter-signed token) to the second computerized device. After the second computerized device receives the electronic scanned image and the metadata from the scanning machine, the second computerized device then calculates a cryptographic digest from the metadata and the electronic scanned image, and supplies the cryptographic digest to the application running on the portable computing device.

Once the application receives the cryptographic digest, the application encrypts the cryptographic digest using a private key to create a content signature of the cryptographic digest. In turn, the application then sends the content signature to the second computerized device to allow the content signature to be accessed when a copy of the electronic scanned image is requested for download. With this, any party (the application, or any other party with which the private key has been shared) to verify the authenticity of a copy of the electronic scanned image provided by the second computerized device. More specifically, the authenticity of the copy of the electronic scanned item is verified by recalculating the content signature based on the copy of the electronic scanned image the using the encryption key.

Exemplary systems herein can include, among other components, an application running on a portable computerized device, and at least one second computerized device separate from the portable computerized device. The portable computerized device has the ability to communicate wirelessly with a machine that will perform the scanning (such as a stand-alone scanner, a multifunction device (MFD), standard copier/printer, etc.). Such wireless communication can be performed using techniques such as near field communication (NFC), or other wireless forms of communication that obtain an identification code from the scanning machine.

Once the application has obtained the unique identifier of the scanning machine, the application contacts a separate computer server (second computerized device) over a network to obtain a time stamped location token from the second computerized device. The time stamped location token allows the application to verify that the scanning machine is authentic (by being in the correct location) and also provides a time stamp to identify when the scanning took place.

The application causes the portable computerized device to transmit the time stamped location token to the scanning machine (using, for example, the near field communication capability). In return, scanning machine uses a certificate that the scanning machine maintains to sign the time stamped location token to create a counter-signed token and transmit the counter-signed token back to the portable computing device. The application then causes the portable computing device to counter-sign the counter-signed token using a unique certificate maintained within the portable computing device to create the counter-counter-signed token.

Next, the scanning machine scans the physical item to create an electronic scanned image. The application causes the portable computing device to transmit the counter-counter-signed token to the scanning machine and causes the scanning machine to include the counter-counter-signed token within the metadata of the electronic scanned image. Further, the application causes the scanning machine to transmit the electronic scanned image (and the metadata containing the counter-counter-signed token) to the second computing device over the network, which allows the second computing device to calculate a cryptographic digest by applying a cryptographic hash function to the electronic scanned image and metadata. Then, the second computerized device returns the cryptographic digest to the portable computing device along with the electronic scanned image (or a thumbnail thereof) that the second computerized device has received from the scanning machine and has stored.

When the application receives the stored version of the electronic scanned image and the cryptographic digest from the second computerized device, it displays the stored version of electronic scanned image on a display of the portable computerized device for approval by a user. Any such approval from the user will be received by the application through the portable computerized device. Only after receiving approval from the user, the application then encrypts the cryptographic digest using an encryption key stored on the portable computerized device to create a "content signature" of the cryptographic digest, which can be used later to verify the authenticity of the electronic scanned image. The application then sends the content signature to the second computerized device to allow the content signature to be supplied with any copies of the electronic scanned image that are downloaded from the second computerized device.

Any party having the cryptographic hash function and the private key of the portable computerized device can then verify the authenticity of the electronic scanned image. More specifically, in order to verify the authenticity of a copy of the electronic scanned image provided by the second computerized device, the data from the electronic scanned image (including any metadata) is applied to the cryptographic hash function to re-create a new (current) cryptographic digest. Then, the private key of the portable computerized device is used to encrypt the cryptographic digest to create a new (current) content signature. The current content signature is then compared with the content signature downloaded from the second computerized device. If the current content signature is the same as the downloaded content signature, this indicates that the electronic scanned image has not been altered, thereby verifying the electronic scanned image as being genuine.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, there are many use cases where it is worthwhile to be able to verify that the scan data was delivered correctly, that the scan originated in a known and verifiable location, by a known and verifiable person, and that it has not been tampered with or compromised since it was scanned and deposited. In order to address such issues, the systems and methods herein provide the time and location when and from where the scan originated, the identity of the person who performed the scan, and a unique and verifiable description of the data itself, as it was delivered. Thus, the systems and methods herein provide convenient verification of the above assurances. This ease of use simplifies adoption and practice of the steps used to provide the above assurances.

One prominent kind of tag is the rewritable computational tag. The reader and writer of such tags should be physically close to the tag (which may only operate within a range of 1 meter or substantially closer distances (such as actual contact, that occurs at "zero" distance or no distance) in order to communicate with the tag. The tag can be affixed externally or internally without any other integration to the device to which it is connected. Thus, such tags (or identification codes) can be maintained in wireless devices that can be read by equipment such as near field communication systems (NFC), radio frequency identification systems (RFID), and Bluetooth systems, etc. Such identification codes are commonly used to identify equipment and features or provide other information that is location-sensitive, and portable devices such as smartphones can read machine-readable tags.

The systems and methods herein can utilize, for example, such computational communication tags, incorporated within or on an office multifunction device. Such a tag is capable of computing signatures, and may be passive or active (a "hotspot"). Additionally, systems and methods herein can utilize, for example, a mobile device, with NFC support and an application installed on it, a trusted scan delivery service, hosted (for example) on a network, such as in the cloud, a location assurance service, etc.

Figure 1:
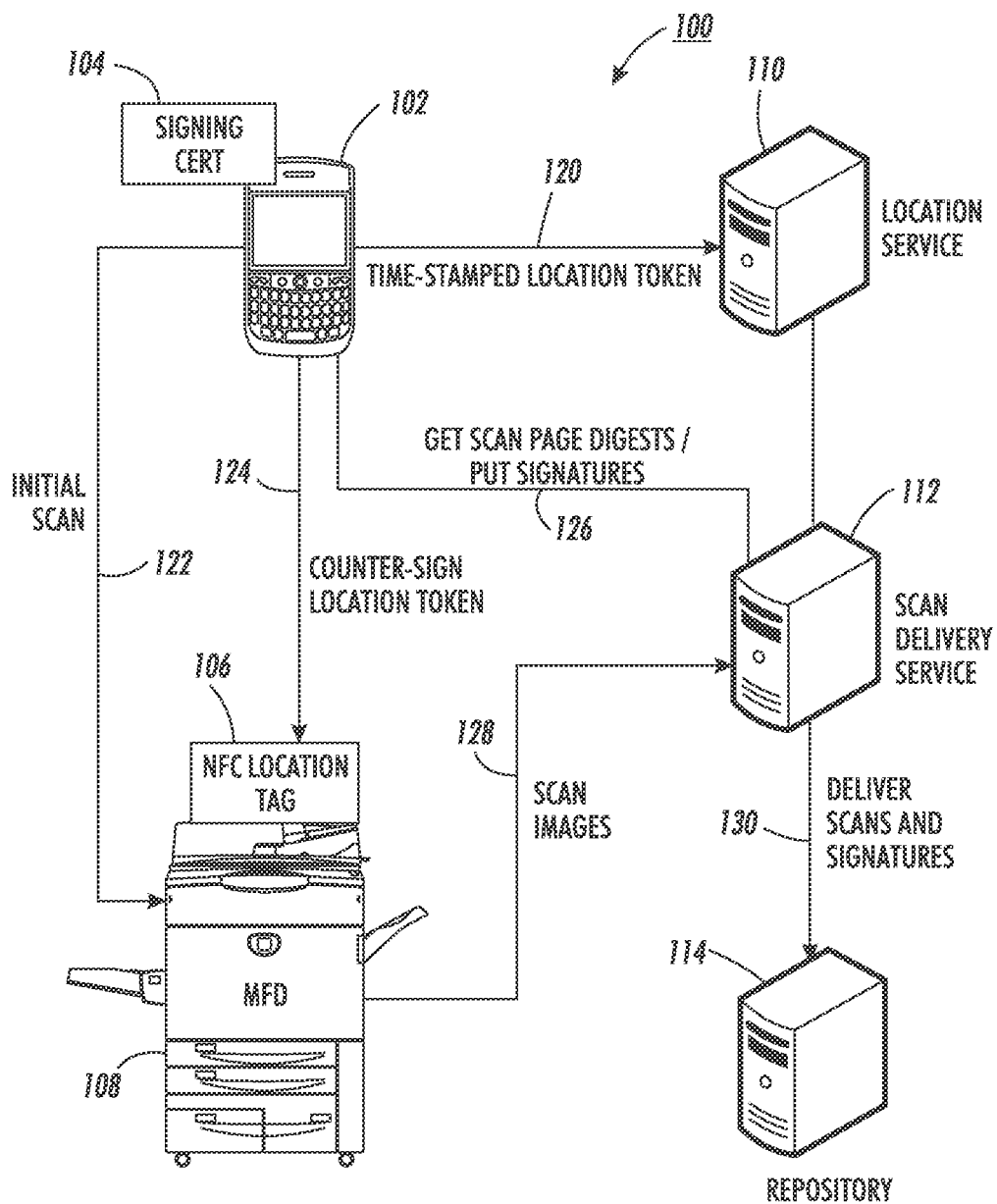
FIG. 1 is a schematic diagram illustrating devices herein.

Typical use of the systems and methods herein is provided in the following non-limiting example that is illustrated in FIG. 1. In this example, the user walks up to the multifunction device 108 and loads a stack of pages to be scanned. The user taps the computational NFC tag 106 on the multifunction device 108 using a mobile device 102, such as a smart phone, PDA, laptop, etc. An application already installed on the mobile device 102 automatically starts as a result of the tap.

In a tapping motion, the user's portable device taps or touches the exterior of the processing device. In the tapping process, the user touches the mobile device to the area of the scanning or processing device that contains the near field wireless communication device. Such tags are commonly included near (within a few cm of) the exterior of the scanning or processing device in a region that is easy for the user to reach. While the concept of an item being tapped by another item is well-understood, for clarity herein, a "tap" occurs when a user causes the distance between the first device and the second device to change from a first distance to a second, closer distance and then return to at least the first distance within a predetermined period of time (where, for example, the first distance between the devices can be at least twice as large as the second, closer distance). In other words, a tap or touch occurs when the user brings a hand held portable computing device very close to or touching against another computing device, so close that they usually tap or touch the other computing device with theirs (although actual physical contact is not required, just a relative change in proximity). The wireless antennas of the close proximity wireless devices are usually located just under the cover of such devices, placing such antennas less than a few cm away from each other when the two devices are in physical contact during the touch or tap. The predetermined period of time can be, for example, less than 5 seconds but can be much longer (and will commonly be less than 1 second) and the second distance can be, for example, less than 10 cm (and will commonly by less than 1 cm (or zero)).

The application contacts the location assurance service 110 and obtains a time stamped token 120 from it. This token 120 has been signed by the location assurance service 110 to guarantee the time stamp. The application passes the token 120 to the computational NFC tag 106 for counter-signature. The application then counter-counter signs the token 124 using the certificate of the user, which is stored (as per usual) on the mobile device 102. The mobile device 102 or user can then initiate a scan operation 122, passing the counter-counter signed token 124 to the multifunction device 108 for delivery with the scan meta-data. The scan is addressed to the scan delivery service 112, and has a unique job identifier.

The application polls the scan delivery service 112 for notifications about the progress of scan delivery. The scanner of the multifunction device 108 delivers the data and the counter-counter signed token 128 to the scan delivery service 112. The scan delivery service 112 can pass the location token to the location assurance service 110 for another counter-signature so that the time of receipt (hence the duration of the scan operation) can be assured. As would be understood by those ordinarily skilled in the art, the number of counter-signatures that are added to the token increases the authentication trail, thereby making the authentication process more robust; however, each counter-signature adds complexity to the processing and, therefore, some or all of the counter-signatures discussed herein can be optionally omitted so as to simplify processing.

The scan delivery service 112 calculates cryptographic digests of each scanned image, and any accompanying data file, and notifies the application that data with the given digests has been received. The mobile device 102 obtains previews of the scans 126 that are to be delivered from the scan delivery service 112 and lets the user inspect them. If the user is satisfied that the scanned images are correct, the application encrypts the digests using a secret encryption key stored on, or generated by, the mobile device 102, forming a signature for the content, and sends the content signature as a file 126 back to the scan delivery service 112, which then delivers the scan data, along with the counter-counter-signed location token and content signature file 130 to the intended destination (shown as the repository 114 in FIG. 1). Otherwise, the scan data is discarded and the process terminates.

The application stores a record of the digests obtained from the delivery service 112 and associated signature and stored repository 114 locations. This may be done locally on the smart phone, or by using some external service for later lookup, or both (for redundancy). Later, the user may consult the list of scan jobs, and verify that the scans are correctly stored in the repository 114, by simply pressing a "verify" button of the application running on the mobile device 102, so that the data is retried from the repository 114, with the mobile device 102 recalculating the signature and checking that it matches. When using such a "verify" button, the entire verification process is fully automatically performed by the portable computerized device, and the only action the user takes is to select the verify button, in response to which the user receives a verification success/failure message displayed by the application on the portable computerized device.

This verification process uses the scan data from the portable device and the certificate from the portable device to create the signature and, therefore, this verification process has no dependence on Public Key Infrastructure or similar systems. The user has all the information necessary to re-create the signature stored on their mobile device 102 (or other service). If they trust their own key (say, from a self-signed or generated certificate) then the verification process is informative to them. Likewise, the user or other parties may later verify that the scan was performed at the given location by the given person by verifying the counter-counter-signed token described above.

Thus, the systems and methods herein can use, but do not inherently depend on, public/secret key cryptography or similar systems. Following the procedure given, any key, symmetric or asymmetric, will work. Similarly, the location assurance does not inherently depend on public key/secret key cryptography, and other schemes are useful. However, verification of signatures by other parties may be simplified when public key/secret key techniques are used.

In the above example, the potentially counter-counter-signed token additionally provides assurance of the time and location of the scan for its entire duration; and the encrypted scan data digests (signatures) provide assurance of correct scan job data delivery and tamper-free retention.

By storing the signature with the scans and on the mobile device itself, convenient verification at later times is made possible, by using the mobile phone itself and a few button clicks supplied to the application. Local storage of the signatures and the use of self-signed certificates enhance ease of use because the user has a readily accessible way to store and use the certificates on the mobile device. Alternatively, the log of scans and signatures could be stored securely elsewhere as a backup, but it is convenient to use if the mobile has direct access to it when the user wants to perform verification.

It should be understood that functional deficiencies in various scanner models can be accommodated using the mobile. For example, if the scanner cannot itself deliver data to the scan delivery service, then the mobile may directly read the scan data back to its own storage, and then push it to the scan delivery service, or it may then incorporate the scan delivery service functionality within the mobile itself. These system architecture details do not change the characteristics of the systems and methods herein. Therefore, as shown above, the systems and methods herein provide multiple explicit and verifiable delivery and integrity guarantees, in a convenient form.

Figure 2:
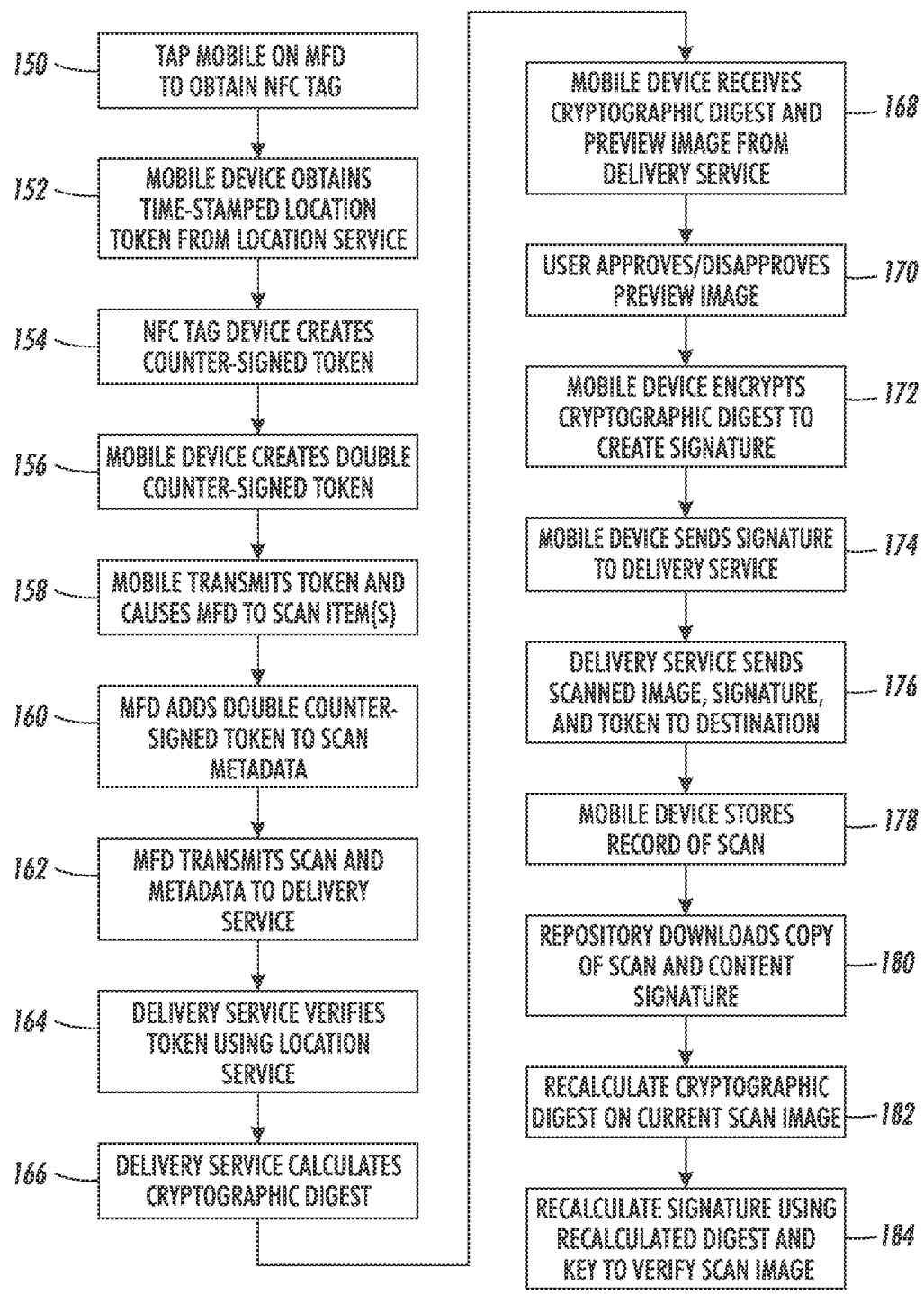
FIG. 2 is a flow diagram of various methods herein.

FIG. 2 is flowchart illustrating exemplary methods herein. In item 150, an NFC tag (e.g., a machine identification code) is received by a portable computerized device (e.g., a mobile device) from a near field communication (NFC) device (e.g., a machine identification code device) positioned within or on a multi-function printing device (e.g., a MFD or a scanning machine) by touching or tapping the mobile device (using a NFC wireless reader of the mobile device). As would be understood by those ordinarily skilled in the art, the reading of the NFC tag by the NFC reader of the mobile device occurs while the mobile device is positioned at a location that is within a predetermined distance from the MFD (e.g., generally a few centimeters).

The mobile device uses the NFC tag to obtain a time stamped location token from a location assurance service (e.g., a first computerized device separate from the mobile device and the MFD) in item 152. The information from the time stamped location token will eventually be included with the scanned images to allow the user to verify that the scanned images were obtained at the location where the user performed the scanning and at the time that the user performed the scanning. For example, the NFC tag of the scanning device uniquely identifies the scanning device. The files maintain within the computerized server of the location service can contain a lookup table that utilizes the NFC tag to identify the specific scanning device and related information, which can include the physical location of the scanning device.

Therefore, by obtaining the time stamped location token, the application running on the mobile device obtains a unique identification of the scanning device and its location. If the mobile device also includes its own positioning system (an indoor positioning system or a global positioning system (GPS)), the mobile device can also confirm that the scanning device is at the same location indicated in the time stamped location token to guarantee that the scanning device is legitimate and can be used properly to performs scanning (without risk of the scanning device being a counterfeit device that may inappropriately handled the scanned images). For example, if the scanning device is not at the same location indicated within the time stamped location token, a warning can be provided to the user on the graphical user interface of the mobile device that the scanning device may not be authentic, and may not be trustworthy.

The mobile device then sends the time stamped location token to the NFC tag device to cause the NFC tag device to create a counter-signed location token in item 154. As noted above, the NFC device is a computational device that contains its own certificate and, therefore, the NFC tag device is capable of counter signing items. The mobile device receives the counter-signed location token from the NFC tag device and then the mobile device uses its own certificate to sign the counter-signed location token (using a certificate of the mobile device) to create a counter-counter-signed (double counter-signed) location token in item 156.

The mobile device or the user directly or indirectly causes the scanning device to scan a physical item in item 158 (such as previously printed sheets of print media) to generate an electronic scanned image. As would be understood by those ordinarily skilled in the art, the application (or "app") running on the mobile device is a set of instructions (which can be in the form of software). In addition, the mobile device includes one or more additional applications that allow the mobile device to communicate with and potentially control the actions of the scanning device (by communicating with and/or controlling applications running on the scanning device) in this way, the application running on the mobile device can cause the scanning device to perform certain actions. For example, the mobile device sends the double counter-signed location token to the scanning device and causes the scanning device to include the double counter-signed location token in metadata of the electronic scanned image in item 160.

In item 162, the mobile device directly or indirectly causes the scanning device to transmit the electronic scanned image containing the metadata to a delivery service (e.g., a second computerized device separate from the first computerized device, the mobile device, and the scanning device). The mobile device directly or indirectly causes the delivery service to send the double counter-signed location token to the location assurance service for verification in item 164. Specifically, in item 164 the location assurance service checks the metadata that accompanies the scanned image to determine whether the time stamped location token that it previously issued has been altered. If the location assurance service cannot verify the double counter-signed location token, the application running on the mobile device warns the user of the error/potential lack of authentication trail. Thus, in item 164, the application running on the mobile device directly or indirectly causes the location assurance service to send a verification or non-verification indication to the delivery service.

Based on the verification, the application running on the mobile device directly or indirectly causes the delivery service to calculate a cryptographic digest. For example, upon receiving the verification from the location assurance service, the delivery service can automatically apply a cryptographic hash function (known to the application running on the mobile device) to data (and metadata) of the electronic scanned image in item 166. The mobile device then receives the cryptographic digest and a preview image (which can be all scanned images, less than all scanned images, thumbnail images, etc.) of the electronic scanned image from the delivery service as an indication that the delivery service has received the electronic scanned image in item 168. The mobile device displays the preview image(s) on its graphical user interface and, in return, receives user input into the graphical user interface approving or disapproving the preview image in item 170.

Based on the user input approving the preview image, the mobile device encrypts the cryptographic digest using an encryption key stored on (or generated by) the mobile device to create a signature (e.g., "original content signature") of the cryptographic digest in item 172. The mobile device then sends the original content signature to the delivery service in item 174 and directly or indirectly causes the delivery service to send the electronic scanned image and the original content signature to a destination (such as a repository, etc.) in item 176.

Then, the mobile device internally stores a record of the destination, the electronic scanned image, the double counter-signed location token, and the original content signature in item 178. This allows the mobile device, or another with which the mobile device has shared the encryption key, to verify the authenticity of the electronic scanned image in item by recalculating the content signature at a later time. More specifically, any party having the cryptographic hash function and the private key of the portable computerized device can request and receive a copy of the scanned image (including any metadata) and the original content signature (item 180) and then verify the authenticity of the electronic scanned image by recalculating a new content signature and determining if the new content signature matches the original content signature.

More specifically, in order to verify the authenticity of a copy of the electronic scanned image provided along with the original content signature by the delivery service or repository, the data from the electronic scanned image (including any metadata, such as the double or triple counter-signed time stamped location token) is applied to the cryptographic hash function to re-create a new (current) cryptographic digest in item 182. Thus, the current cryptographic digest can be calculated locally or remotely and is based upon version of the scan that is received from the delivery service or repository (which may or may not be an authentic scan).

Then, the private key of the portable computerized device is used (either by the portable computerized device itself or by another device to which the portable computerized device has provided the key) to encrypt the current cryptographic digest to create a new (current) content signature in item 184. The current content signature is then compared with the original content signature provided with the copy of the electronic scanned image in item 184 (and the various counter signed tokens, time stamped, location information, etc., can be verified for accuracy) to determine if the current content signature is the same as downloaded original content signature in item 184. This comparison indicates whether the electronic scanned image has been altered, thereby verifying the electronic scanned image as being genuine (being genuine means that the scan provided by the delivery service/repository is the same scan obtained in item 158 and, that it has not been altered in any way).

Stated differently, these methods verify the authenticity of a scan using a system comprising an application running on a portable computerized device and a "second" computerized device (which can be multiple devices including a "first" device which can be the location assurance service and other devices, such as the delivery service, the repository etc.). Such "second" computerized device(s) are separate from the portable computerized device and from the scanning device. Such methods cause a scanning machine to scan a physical item to generate an electronic scanned image (158) and cause the scanning machine to transmit the electronic scanned image to the second computerized device (162). With such methods, a cryptographic digest is calculated (166) using the second computerized device by applying a cryptographic hash function to data of the electronic scanned image.

These methods also use the application to encrypt the cryptographic digest (172) using an encryption key stored on the portable computerized device, and this creates an original content signature of the cryptographic digest. Then, the original content signature is sent to the second computerized device (174).

After the application sends the original content signature to the second computerized device, these methods can receive a request to a download a copy of the electronic scanned image from a requestor (180). In response to the request to download the copy of the electronic scanned image, these methods recalculate a "current" cryptographic digest (locally or using the second computerized device) by applying the cryptographic hash function to data of the copy of the electronic scanned image (182). Then, the requester can encrypt such a current cryptographic digest using the encryption key stored on the portable computerized device to create a "current" content signature of the current cryptographic digest. By comparing the current content signature with the original content signature to see if the signatures match, this verifies whether the copy of the electronic scanned image is identical to the electronic scanned image (184).

Additional methods herein verify the authenticity of a scan using a system, such as those discussed above. Such methods send a token (such as a time stamped location token) to a wireless scanning machine identification code device (such as a near field communications tag) of a scanning machine while the portable computerized device is positioned within communicating distance of the near field communications tag (e.g., at a first location that is within a first distance from the scanning machine) to cause the scanning machine identification code device to create a counter-signed token (154). The counter-signed token is received back from the wireless machine identification code device by the portable computerized device while positioned at the first location. Having received the counter-signed token from the scanning machine, the application then signs the counter-signed token (156) using a certificate of the portable computerized device to create a double counter-signed token (or what is sometimes referred to as a "counter-counter-signed token").

Then, the application (or the user) causes the scanning machine to scan a physical item to generate an electronic scanned image (158). The application sends the counter-counter-signed token to the scanning machine (158) to cause the scanning machine to include the counter-counter-signed token in metadata of the electronic scanned image (160). The scanning machine then sends the electronic scanned image (including the metadata that contains the counter-counter-signed token) to the second computerized device (162). After the second computerized device receives the electronic scanned image and the metadata from the scanning machine, the second computerized device then calculates a cryptographic digest from the metadata and the electronic scanned image (166), and supplies the cryptographic digest to the application running on the portable computing device (168).

Once the application receives the cryptographic digest, the application encrypts the cryptographic digest using a private key to create an original content signature of the cryptographic digest (172). In turn, the application then sends the original content signature to the second computerized device (174) to allow the original content signature to be accessed when a copy of the electronic scanned image is requested for download (180). With this, any party (the application, or any other party with which the private key has been shared) to verify the authenticity of a copy of the electronic scanned image provided by the second computerized device (184). More specifically, the authenticity of the copy of the electronic scanned item is verified by recalculating a new, current content signature based on the copy of the electronic scanned image received, using the encryption key (184).

Figure 3:
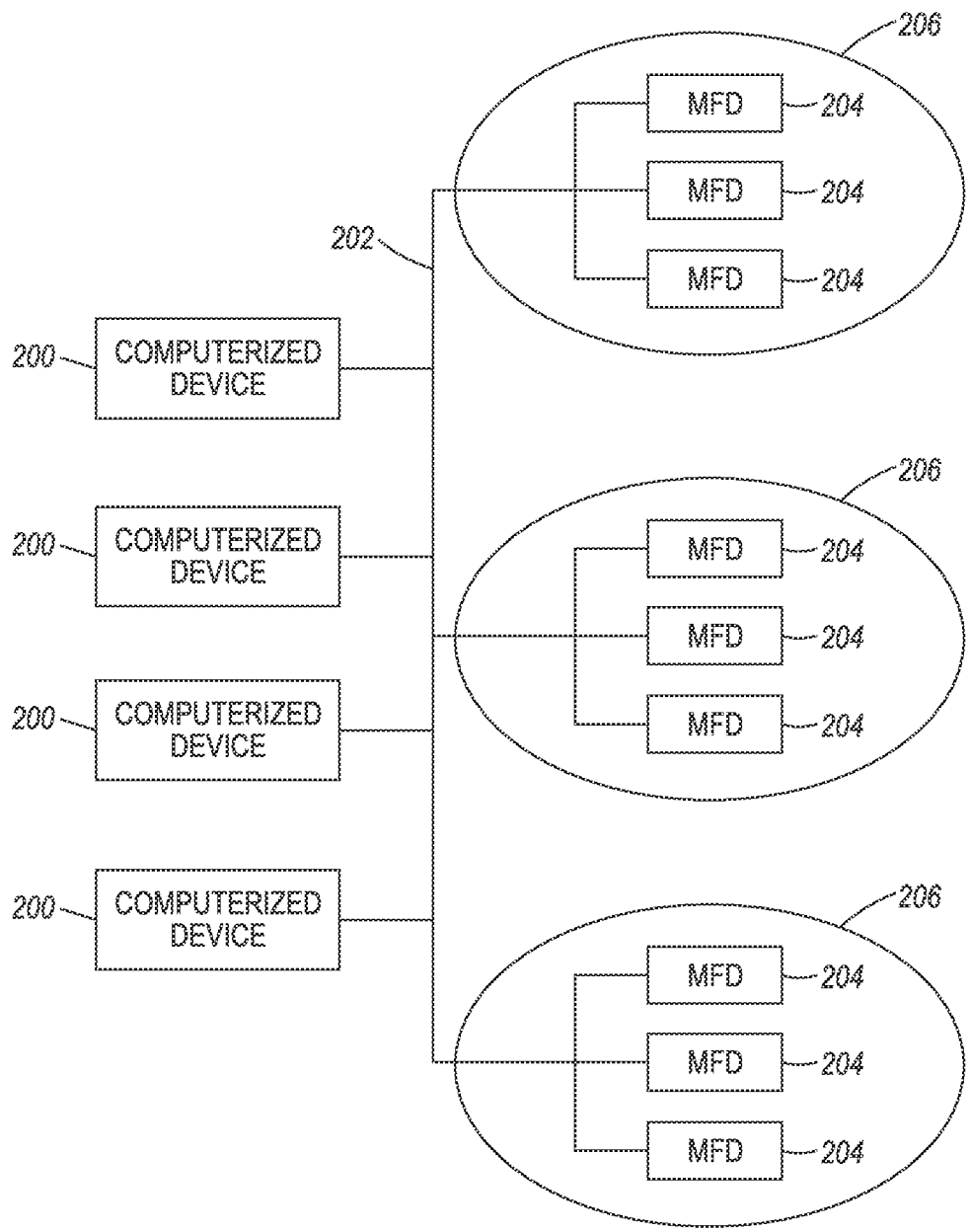
FIG. 3 is a schematic diagram illustrating systems herein.

As shown in FIG. 3, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 4:
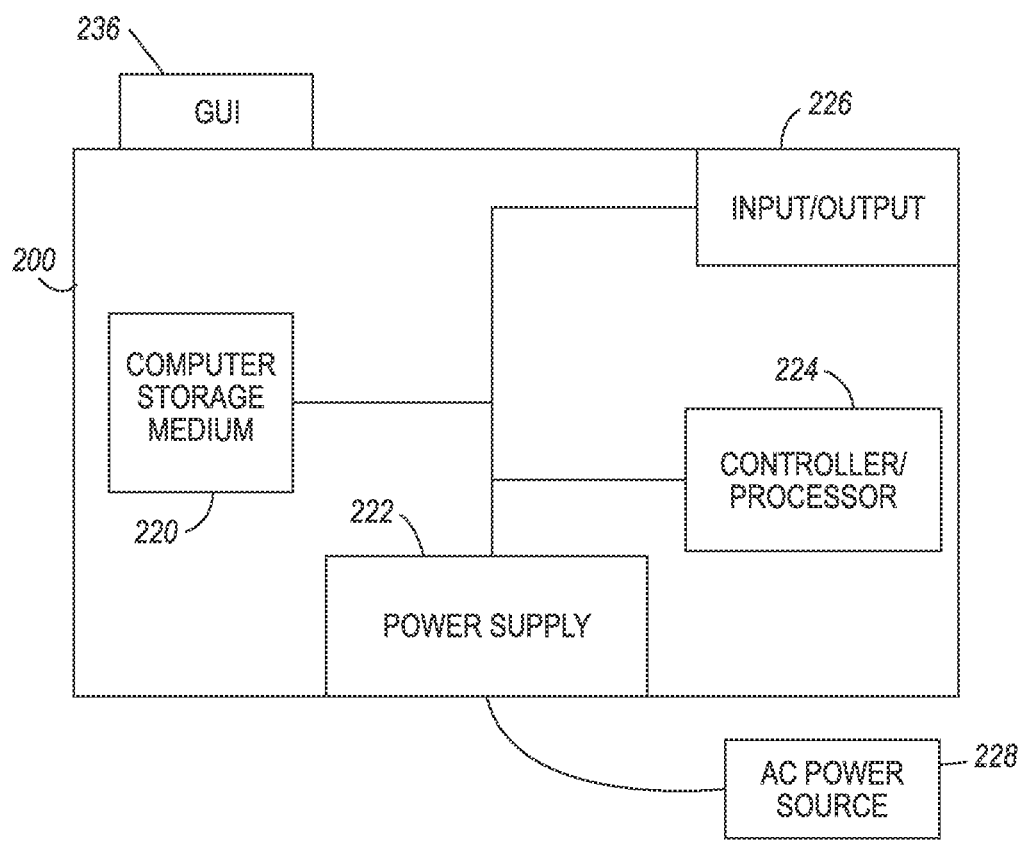
FIG. 4 is a schematic diagram illustrating devices herein.

FIG. 4 illustrates a computerized device 200, which can be used with systems and methods herein and can comprise, for example, a print server, a personal computer, a portable computing device, etc. The computerized device 200 includes a controller/tangible processor 224 and a communications port (input/output) 226 operatively connected to the tangible processor 224 and to the computerized network 202 external to the computerized device 200. Also, the computerized device 200 can include at least one accessory functional component, such as a graphic user interface assembly 236 that also operate on the power supplied from the external power source 228 (through the power supply 222).

The input/output device 226 is used for communications to and from the computerized device 200. The tangible processor 224 controls the various actions of the computerized device. A non-transitory computer storage medium device 220 (which can be optical, magnetic, capacitor based, etc.) is readable by the tangible processor 224 and stores instructions that the tangible processor 224 executes to allow the computerized device to perform its various functions, such as those described herein. Thus, as shown in FIG. 3, a body housing has one or more functional components that operate on power supplied from an alternating current (AC) source 228 by the power supply 222. The power supply 222 can comprise a power storage element (e.g., a battery, etc).

Figure 5:
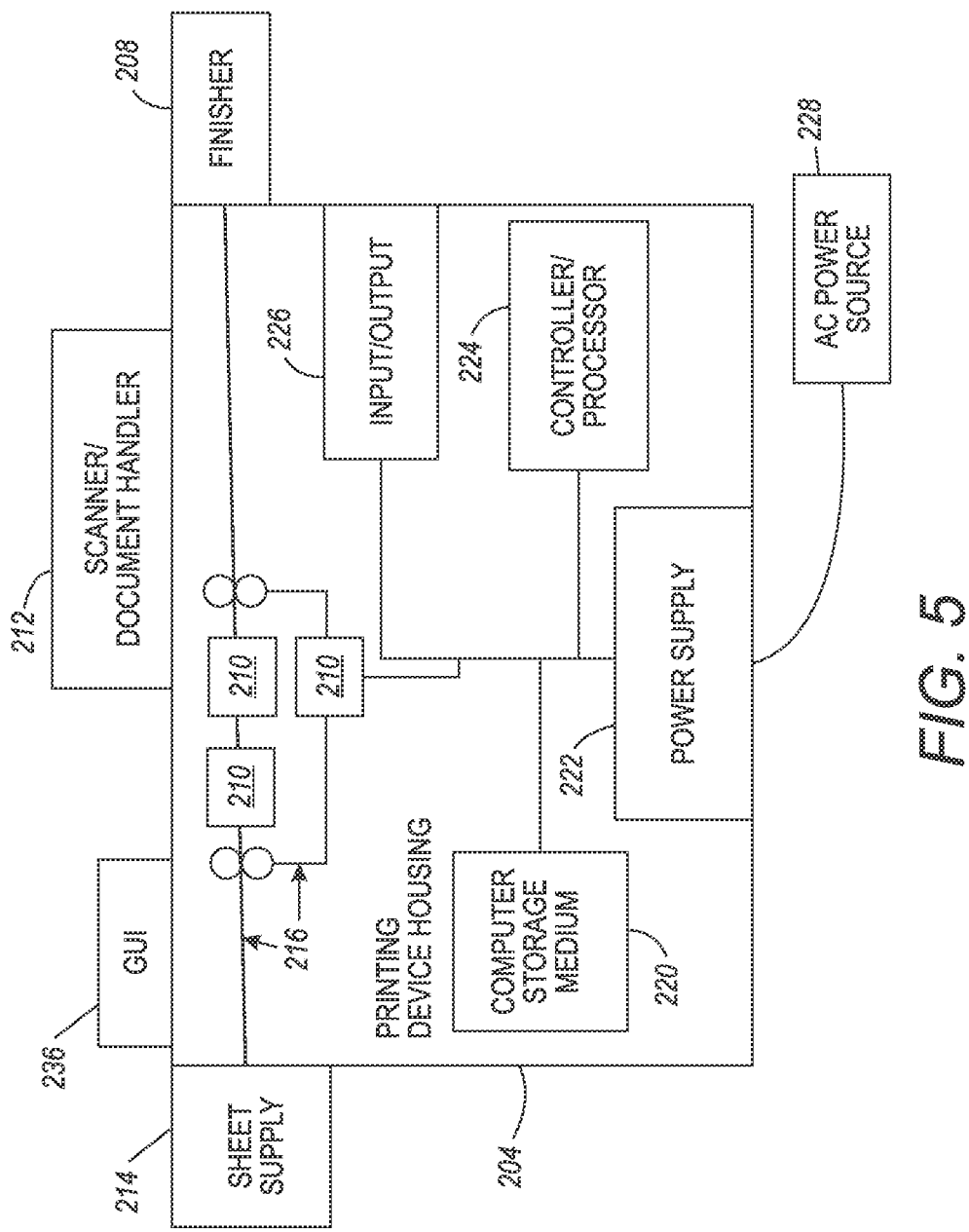
FIG. 5 is a schematic diagram illustrating devices herein.

FIG. 5 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engines) 210 operatively connected to the tangible processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operates on the power supplied from the external power source 228 (through the power supply 222).

Thus, exemplary systems herein can include, among other components, an application (which can be stored in memory 220 and executed using processor 224 (and is therefore identified using identification numerals 220/224 at some points herein)) running on a portable computerized device 200, and at least one second computerized device (and the "second" computerized device is intended to represent any of the various devices 110, 112, 114 discussed herein) separate from the portable computerized device 200. The portable computerized device 200 has the ability to communicate wirelessly (item 226) with a machine 212 that will perform the scanning (such as a stand-alone scanner, a multifunction device (MFD), standard copier/printer, etc.). Such wireless communication can be performed using techniques such as near field communication (NFC), or other wireless forms of communication that obtain an identification code from the scanning machine 212.

Once the application 220/224 has obtained the unique identifier of the scanning machine 212, the application 220/224 contacts a separate computer server (e.g., one of the second computerized devices 110, 112, 114) over a network 202 to obtain a time stamped location token 120 from the second computerized device 110, 112, 114. The time stamped location token 120 allows the application 220/224 to verify that the scanning machine 212 is authentic (by being in the correct location) and also provides a time stamp to identify when the scanning took place.

The application 220/224 causes the portable computerized device 200 to transmit the time stamped location token 120 to the scanning machine 212 (using, for example, the near field communication capability). In return, scanning machine 212 uses a certificate that the scanning machine 212 maintains to sign the time stamped location token 120 to create a counter-signed token 124 and transmit the counter-signed token 124 back to the portable computing device. The application 220/224 then causes the portable computing device to counter-sign the counter-signed token 124 using a unique certificate maintained within the portable computing device to create the counter-counter-signed token.

Next, the scanning machine 212 scans the physical item to create an electronic scanned image. The application 220/224 causes the portable computing device to transmit the counter-counter-signed token to the scanning machine 212 and causes the scanning machine 212 to include the counter-counter-signed token within the metadata of the electronic scanned image 128. Further, the application 220/224 causes the scanning machine 212 to transmit the electronic scanned image 128 (and the metadata containing the counter-counter-signed token 124) to the second computing device 110, 112, 114 over the network 202, which allows the second computing device 110, 112, 114 to calculate a cryptographic digest by applying a cryptographic hash function to the electronic scanned image and metadata. Then, the second computerized device 110, 112, 114 returns the cryptographic digest to the portable computing device along with the electronic scanned image (or a thumbnail thereof) 126 that the second computerized device 110, 112, 114 has received from the scanning machine 212 and has stored.

When the application 220/224 receives the stored version of the electronic scanned image and the cryptographic digest 126 from the second computerized device 110, 112, 114, it displays the stored version of electronic scanned image on a display 236 of the portable computerized device 200 for approval by a user. Any such approval from the user will be received by the application 220/224 through the portable computerized device 200. Only after receiving approval from the user, the application 220/224 then encrypts the cryptographic digest using an encryption key stored on the portable computerized device 200 to create a "content signature" of the cryptographic digest, which can be used later to verify the authenticity of the electronic scanned image. The application 220/224 then sends the content signature to the second computerized device 110, 112, 114 to allow the content signature to be supplied with any copies of the electronic scanned image that are downloaded 130 from the second computerized device 110, 112, 114.

Any party having the cryptographic hash function and the private key of the portable computerized device 200 can then verify the authenticity of the electronic scanned image. More specifically, in order to verify the authenticity of a copy of the electronic scanned image 130 provided by the second computerized device 110, 112, 114, the data from the electronic scanned image (including any metadata) 130 is applied to the cryptographic hash function to re-create a new (current) cryptographic digest. Then, the private key of the portable computerized device 200 is used to encrypt the cryptographic digest to create a new (current) content signature. The current content signature is then compared with the original content signature downloaded from the second computerized device 110, 112, 114 with the scan data. If the current content signature is the same as downloaded original content signature, this indicates that the electronic scanned image has not been altered, thereby verifying the electronic scanned image as being genuine.

As would be understood by those ordinarily skilled in the art, the printing device 204 shown in FIG. 5 is only one example and the systems and methods herein are equally applicable to other types of printing devices that may include fewer components or more components. For example, while a limited number of printing engines and paper paths are illustrated in FIG. 5, those ordinarily skilled in the art would understand that many more paper paths and additional printing engines could be included within any printing device used with systems and methods herein.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted here from to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

The set of image input devices is intended to encompass a wide variety of devices such as, for example, digital document devices, computer systems, memory and storage devices, networked platforms such as servers and client devices which can obtain pixel values from a source device, and image capture devices. The set of image capture devices includes scanners, cameras, photography equipment, facsimile machines, photo reproduction equipment, digital printing presses, xerographic devices, and the like. A scanner is one image capture device that optically scans images, print media, and the like, and converts the scanned image into a digitized format. Common scanning devices include variations of the flatbed scanner, generally known in the arts, wherein specialized image receptors move beneath a platen and scan the media placed on the platen. Modern digital scanners typically incorporate a charge-coupled device (CCD) or a contact image sensor (CIS) as the image sensing receptor(s). The scanning device produces a signal of the scanned image data. Such a digital signal contains information about pixels such as color value, intensity, and their location within the scanned image. Further, the terms automated or automatically mean that once a process is started (by a machine or a user); one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method of verifying authenticity of a scan using a system comprising: an application running on a portable computerized device; and a second computerized device separate from said portable computerized device, said method comprising:
    obtaining, by said application, a token from said second computerized device;
    supplying, by said application, a certificate;
    signing, by said application, said token using said certificate to create a counter-signed token;
    causing, by said application, said counter-signed token to be added to metadata of an electronic scanned image generated by activity of said application;
    receiving, by said second computerized device, said electronic scanned image and said metadata;
    calculating, by said second computerized device, a cryptographic digest from data of said electronic scanned image and said metadata;
    receiving, by said application, from said second computerized device, said cryptographic digest;
    encrypting, by said application, said cryptographic digest using an encryption key stored on said portable computerized device to create a content signature of said cryptographic digest;
    sending, by said application, said content signature to said second computerized device; and
    verifying authenticity of a copy of said electronic scanned image provided by said second computerized device by recalculating said content signature for said copy of said electronic scanned image said using said encryption key.

2. The method according to claim 1, further comprising:
    receiving, by said application, a time stamp from said second computerized device; and
    adding, by said application, said time stamp to metadata of said electronic scanned image before said receiving said electronic scanned image by said second computerized device,
    said calculating said cryptographic digest being based on said data from said electronic scanned image and said metadata.

3. The method according to claim 1, further comprising, before said encrypting said cryptographic digest:
    receiving, by said application, a stored version of said electronic scanned image from said second computerized device;
    displaying, by said application, said stored version of said electronic scanned image on a display of said portable computerized device for approval by a user;
    receiving, by said application, said approval from said user through said portable computerized device; and
    performing said encrypting said cryptographic digest only if said approval is received from said user.

4. The method according to claim 1, said second computerized device comprising a plurality of computerized devices comprising a location service computerized device and a delivery service computerized device, said method further comprising:
   receiving, by said application, from said location service computerized device scanner location information; and
   verifying, by said application, a location of a scanning machine used to create said electronic scanned image based on said location information.

5. A method of verifying authenticity of a scan using a system comprising: an application running on a portable computerized device; and a second computerized device separate from said portable computerized device, said method comprising:
   receiving, by said application, a token from a scanning machine;
   signing, by said portable computerized device, said token using a certificate of said portable computerized device to create a counter-signed token;
   causing said scanning machine to scan a physical item to generate an electronic scanned image;
   sending, by said application, said counter-signed token to said scanning machine to cause said scanning machine to include said counter-signed token in metadata of said electronic scanned image;
   causing, by said application, said scanning machine to transmit said electronic scanned image and said metadata to said second computerized device;
   calculating, by said second computerized device, a cryptographic digest by applying a cryptographic hash function to data of said electronic scanned image and said metadata;
   receiving, by said application, from said second computerized device, said cryptographic digest;
   encrypting, by said application, said cryptographic digest using an encryption key stored on said portable computerized device to create an original content signature of said cryptographic digest;
   sending, by said application, said original content signature to said second computerized device;
   after said application sends said original content signature to said second computerized device, receiving, by said second computerized device, a request to a download a copy of said electronic scanned image from a requestor;
   in response to said request to download said copy of said electronic scanned image, recalculating a current cryptographic digest by applying said cryptographic hash function to data of said copy of said electronic scanned image;
   encrypting said current cryptographic digest using said encryption key stored on said portable computerized device to create a current content signature of said current cryptographic digest; and
   comparing said current content signature with said original content signature to verify whether said copy of said electronic scanned image is identical to said electronic scanned image.

6. The method according to claim 5, further comprising:
   receiving, by said application, a time stamp from said second computerized device; and
   adding, by said application, said time stamp to metadata of said electronic scanned image before said receiving said electronic scanned image by said second computerized device,
   said calculating said cryptographic digest being based on said data from said electronic scanned image and said metadata.

7. The method according to claim 5, further comprising, before said encrypting said cryptographic digest:
   receiving, by said application, a stored version of said electronic scanned image from said second computerized device;
   displaying, by said application, said stored version of said electronic scanned image on a display of said portable computerized device for approval by a user;
   receiving, by said application, said approval from said user through said portable computerized device; and
   performing said encrypting said cryptographic digest only if said approval is received from said user.

8. The method according to claim 5, said second computerized device comprising a plurality of computerized devices comprising a location service computerized device and a delivery service computerized device, said method further comprising:
   receiving, by said application, from said location service computerized device scanner location information; and
   verifying, by said application, a location of a scanning machine used to create said electronic scanned image based on said location information.

9. A method of verifying authenticity of a scan using a system comprising: an application running on a portable computerized device; and a second computerized device separate from said portable computerized device, said method comprising:
   sending, by said portable computerized device, a token to a wireless scanning machine identification code device of a scanning machine while said portable computerized device is positioned at a first location that is within a first distance from said scanning machine to cause said scanning machine identification code device to create a counter-signed token;
   receiving, by said application, said counter-signed token from said wireless machine identification code device while said portable computerized device is positioned at said first location;
   signing, by said portable computerized device, said counter-signed token using a certificate of said portable computerized device to create a counter-counter-signed token;
   causing said scanning machine to scan a physical item to generate an electronic scanned image;
   sending, by said application, said counter-counter-signed token to said scanning machine to cause said scanning machine to include said counter-counter-signed token in metadata of said electronic scanned image;
   receiving, by said second computerized device, said electronic scanned image and said metadata from said scanning machine;
   calculating, by said second computerized device, a cryptographic digest from said metadata and said electronic scanned image;
   receiving, by said application, from said second computerized device, said cryptographic digest;
   encrypting, by said application, said cryptographic digest using an encryption key stored on said portable computerized device to create a content signature of said cryptographic digest;
   sending, by said application, said content signature to said second computerized device; and
   verifying authenticity of a copy of said electronic scanned image provided by said second computerized device by recalculating said content signature for said copy of said electronic scanned image said using said encryption key.

10. The method according to claim 9, further comprising, before said receiving said electronic scanned image by said second computerized device obtaining, by said application, said token from said second computerized device.

11. The method according to claim 9, further comprising:
receiving, by said application, a time stamp from said second computerized device; and
adding, by said application, said time stamp to said metadata of said electronic scanned image before said receiving said electronic scanned image by said second computerized device.

12. The method according to claim 9, further comprising, before said encrypting said cryptographic digest:
receiving, by said application, a stored version of said electronic scanned image from said second computerized device;
displaying, by said application, said stored version of said electronic scanned image on a display of said portable computerized device for approval by a user;
receiving, by said application, said approval from said user through said portable computerized device; and
performing said encrypting said cryptographic digest only if said approval is received from said user.

13. The method according to claim 9, said second computerized device comprising a plurality of computerized devices comprising a location service computerized device and a delivery service computerized device, said method further comprising:
receiving, by said application, from said location service computerized device scanner location information; and
verifying, by said application, a location of a scanning machine used to create said electronic scanned image based on said location information.

14. A system comprising:
an application running on a portable computerized device; and
a second computerized device separate from said portable computerized device,
said application receiving a token from a scanning machine,
said portable computerized device signing said token using a certificate of said portable computerized device to create a counter-signed token,
said scanning machine scanning a physical item to generate an electronic scanned image,
said application sending said counter-signed token to said scanning machine to cause said scanning machine to include said counter-signed token in metadata of said electronic scanned image,
said application causing said scanning machine to transmit said electronic scanned image and said metadata to said second computerized device,
said second computerized device calculating a cryptographic digest from data of said electronic scanned image and said metadata,
said application receiving, from said second computerized device, said cryptographic digest,
said application encrypting said cryptographic digest using an encryption key stored on said portable computerized device to create a content signature of said cryptographic digest,
said application sending said content signature to said second computerized device, and
authenticity of a copy of said electronic scanned image provided by said second computerized device being verified by recalculating said content signature for said copy of said electronic scanned image said using said encryption key.

15. The system according to claim 14, said application receiving a time stamp from said second computerized device,
said application adding said time stamp to metadata of said electronic scanned image before said electronic scanned image is received by said second computerized device,
said calculating said cryptographic digest being based on said data from said electronic scanned image and said metadata.

16. The system according to claim 14, before said encrypting said cryptographic digest:
said application receiving a stored version of said electronic scanned image from said second computerized device;
said application displaying said stored version of said electronic scanned image on a display of said portable computerized device for approval by a user;
said application receiving said approval from said user through said portable computerized device; and
said encrypting said cryptographic digest only being performed if said approval is received from said user.

17. The system according to claim 14, said second computerized device comprising a plurality of computerized devices comprising a location service computerized device and a delivery service computerized device,
said application receiving, from said location service computerized device, scanner location information, and
said application verifying a location of a scanning machine used to create said electronic scanned image based on said location information.

* * * * *